(12) United States Patent  
Saito et al.

(10) Patent No.: US 12,044,551 B2  
(45) Date of Patent: Jul. 23, 2024

(54) ABSOLUTE ENCODER

(71) Applicant: MINEBEA MITSUMI Inc., Nagano (JP)

(72) Inventors: Katsunori Saito, Nagano (JP); Takeshi Sakieda, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 134 days.

(21) Appl. No.: 17/906,292

(22) PCT Filed: Mar. 11, 2021

(86) PCT No.: PCT/JP2021/009862  
§ 371 (c)(1),  
(2) Date: Sep. 14, 2022

(87) PCT Pub. No.: WO2021/200017  
PCT Pub. Date: Oct. 7, 2021

(65) Prior Publication Data  
US 2023/0095065 A1 Mar. 30, 2023

(30) Foreign Application Priority Data  
Mar. 31, 2020 (JP) .................................. 2020-062710

(51) Int. Cl.  
*G01D 5/14* (2006.01)  
*G01D 5/249* (2006.01)

(52) U.S. Cl.  
CPC .......... *G01D 5/145* (2013.01); *G01D 5/2497* (2013.01); *G01D 2205/28* (2021.05)

(58) Field of Classification Search  
CPC .............. G01D 5/145; G01D 2205/26; G01D 2205/28; G01D 5/2497; G01D 5/04;  
(Continued)

(56) References Cited

U.S. PATENT DOCUMENTS 6,424,928 B1 * 7/2002 Elliott .................... G01D 5/145  
702/182  
7,637,347 B2 * 12/2009 Choi ........................ G01D 5/04  
180/444

(Continued)

FOREIGN PATENT DOCUMENTS

CN 207036126 U 2/2018  
JP 56-044218 U 9/1981  
(Continued)

OTHER PUBLICATIONS

International Search Report for corresponding International Application No. PCT/JP2021/009862 mailed May 11, 2021.

(Continued)

*Primary Examiner* — Vinh P Nguyen  
(74) *Attorney, Agent, or Firm* — Pearne & Gordon LLP

(57) ABSTRACT

Detection accuracy of a rotation angle of a sub-shaft is to be improved. In an absolute encoder according to an embodiment of the present invention, a second worm wheel part is a second driven gear, has a central axis orthogonal to a central axis of a first worm wheel part, and meshes with a second worm gear part. A support shaft rotatably supports the second worm wheel part. A magnet (Mq) rotates integrally with the support shaft. An angle sensor (Sq) is provided near the magnet (Mq) and detects a change in a magnetic flux generated from the magnet (Mq). A first bearing has an outer ring fixed at the second worm wheel part and an inner ring fixed at the support shaft. A second bearing has an inner ring fixed at the support shaft.

7 Claims, 12 Drawing Sheets

(58) Field of Classification Search
CPC ........... G01D 5/24442; G01D 2205/40; G01D 5/147; G01D 5/34776; G01D 5/3473; G01D 5/2415; G01D 5/347; G01D 5/245; G01D 5/2451; G01P 3/487; G01P 3/44; G01R 33/0094; G01R 33/072; B60L 2240/421; B60L 2240/423; B60L 2240/441

See application file for complete search history.

(56) References Cited

U.S. PATENT DOCUMENTS

| | | | |
|---|---|---|---|
| 11,365,984 B2 * | 6/2022 | Osada | .................. G01D 5/14 |
| 2013/0015333 A1 | 1/2013 | Miyajima et al. | |
| 2020/0132507 A1 | 4/2020 | Osada | |
| 2022/0155051 A1 * | 5/2022 | Sato | .................. G01D 5/16 |

FOREIGN PATENT DOCUMENTS

| | | | |
|---|---|---|---|
| JP | 07-333008 A | 12/1995 | |
| JP | 2007-255970 A | 10/2007 | |
| JP | 2013-024572 A | 2/2013 | |
| JP | 2015-215037 A | 12/2015 | |
| JP | 2019-015536 A | 1/2019 | |

OTHER PUBLICATIONS

Written Opinion for corresponding International Application No. PCT/JP2021/009862 dated May 11, 2021 and English translation.

* cited by examiner

ABSOLUTE ENCODER

CROSS-REFERENCE TO RELATED APPLICATIONS

This application is a national stage entry of International Application No. PCT/JP2021/009862 filed on Mar. 11, 2021, which claims the benefit of priority to Japanese Application No. JP2020-062710, filed Mar. 31, 2020, the entire disclosures of which are hereby incorporated herein by reference.

TECHNICAL FIELD

The present invention relates to an absolute encoder.

BACKGROUND ART

Conventionally, in various types of control mechanical apparatuses, as a rotary encoder used for detecting the position and the angle of a movable element, an absolute encoder of an absolute type detecting an absolute position or angle (hereinafter referred to as "absolute encoder") has been known.

Some absolute encoders measure the amount of rotation of a main shaft based on the rotation angle of a sub-shaft. Such absolute encoders detect the rotation angle of the sub-shaft based on a change in the magnetic field of a magnet attached at the sub-shaft or to a distal end of a rotating body such as a gear attached at the sub-shaft. The change in the magnetic field is detected by an angle sensor provided to oppose the magnet. The detection accuracy of the angle sensor increases as the vibration of the rotating body decreases.

However, in the absolute encoders, when the bearing provided at the sub-shaft is not pre-loaded, vibration caused in response to the rotation of the gear may be generated in the outer ring of the bearing. The vibration of the outer ring of the bearing may cause an error in detection of the rotation angle.

CITATION LIST

Patent Literature

Patent Literature 1: JP 2013-24572 A

SUMMARY OF INVENTION

Technical Problem

The absolute encoders require a complicated configuration for changing the heights of the inner ring and the outer ring of the bearing in order to suppress the vibration of the bearing with a pre-load applied to the inner ring. Thus, there has been a demand for a simple configuration, and with this configuration, vibration of ball bearings in absolute encoders can be suppressed.

The present invention has been made in view of the above-described problems, and an object of the present invention is to provide an absolute encoder capable of improving detection accuracy of a rotation angle of a sub-shaft.

Solution to Problem

To achieve the above-described object, an absolute encoder according to the present invention includes: a first driving gear rotating according to rotation of a main shaft; a first driven gear including a central axis orthogonal to a central axis of the first driving gear and meshing with the first driving gear; a second driving gear provided coaxially with the first driven gear and rotating according to rotation of the first driven gear; a second driven gear including a central axis orthogonal to the central axis of the first driven gear and meshing with the second driving gear; a support shaft rotatably supporting the second driven gear; a magnet rotating integrally with the support shaft; an angle sensor provided near the magnet and detecting a change in a magnetic flux generated from the magnet; a first bearing including an outer ring fixed at the second driven gear and an inner ring fixed at the support shaft; and a second bearing including an inner ring fixed at the support shaft.

Advantageous Effects of Invention

The absolute encoder according to the present invention allows detection accuracy of a rotation angle of a sub-shaft to be improved.

DESCRIPTION OF EMBODIMENTS

Figure 1:
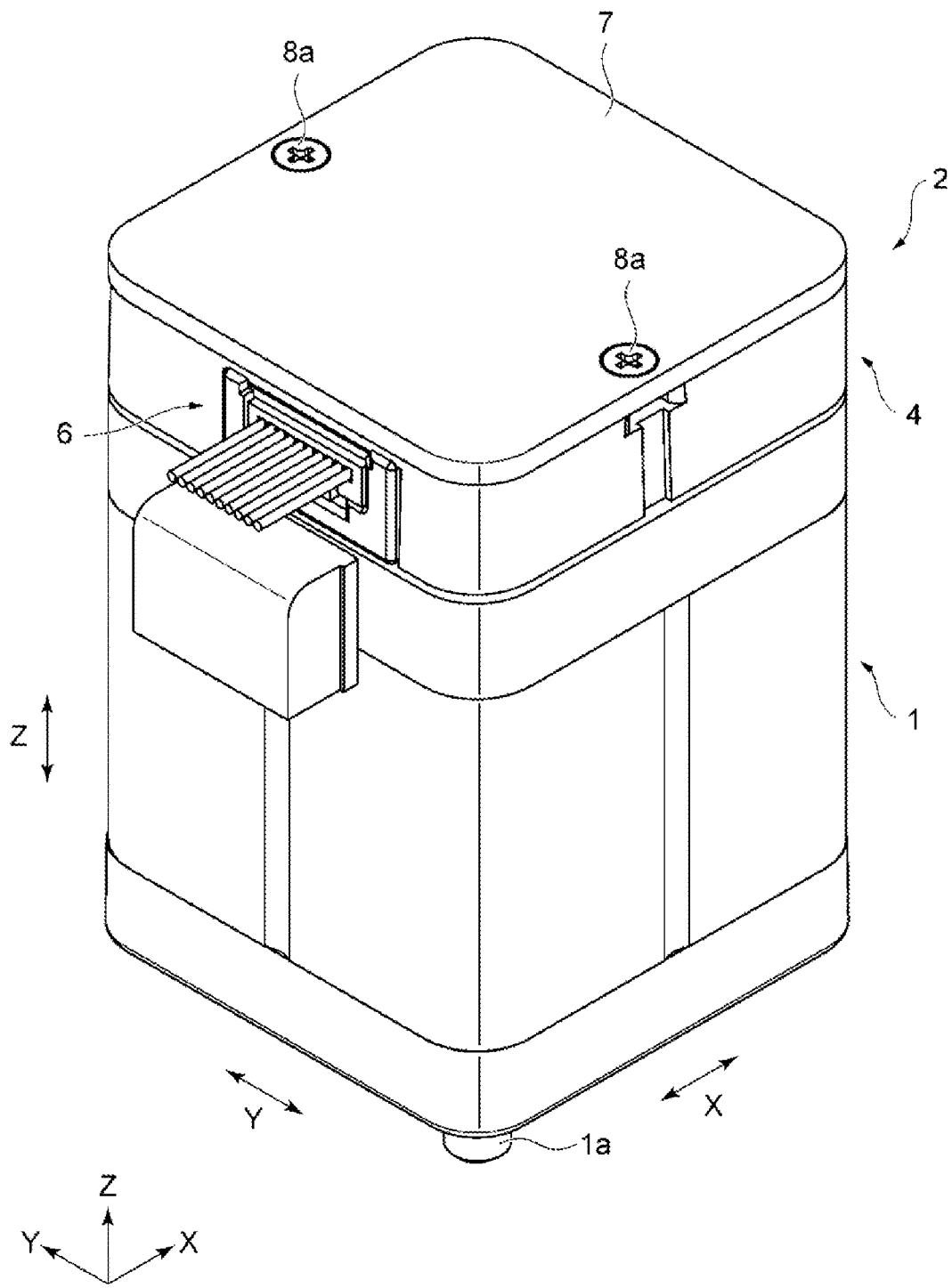
FIG. 1 is a perspective view schematically illustrating the configuration of an absolute encoder according to an embodiment of the present invention.

The present inventors have found that in an absolute encoder, the amount of rotation over a plurality of numbers of rotations (hereinafter, also referred to as a plurality of rotations) of the main shaft (hereinafter, also referred to as the amount of rotation of a main shaft) can be specified by acquiring the rotation angle of a rotating body configured to decelerate and rotate with the rotation of the main shaft. That is, the amount of rotation of the main shaft can be specified by multiplying the rotation angle of the rotating body by a reduction ratio. The specifiable range of the amount of rotation of the main shaft increases in proportion to the reduction ratio. For example, when the reduction ratio is 50, the amount of rotation for 50 rotations of the main shaft can be specified.

On the other hand, the required resolution of the rotating body decreases in proportion to the reduction ratio. For example, when the reduction ratio is 100, the resolution required for the rotating body per rotation of the main shaft is 3.6° (=360°/100), and the detection accuracy of ±1.8° is required. On the other hand, when the reduction ratio is 50, the resolution required for the rotating body per rotation of the main shaft is =7.2° (360°/50), and the detection accuracy of ±3.6° is determined.

Embodiments of the present invention are described below with reference to the drawings. In the embodiments and modifications to be described below, the same or equivalent components and members are denoted by the same reference numerals, and duplicate description will be omitted as appropriate. Furthermore, the dimensions of the members in each drawing are appropriately enlarged or reduced in order to facilitate understanding. Furthermore, some of members not important for explaining the embodiment in each drawing are omitted and displayed. Furthermore, in the drawings, gears are illustrated by omitting a tooth shape. Furthermore, terms including ordinal numbers such as $1^{st}$ and $2^{nd}$ are used for describing various components, but the terms are used only for the purpose of distinguishing one component from other components, and components are not limited by the terms. The present invention is not limited by the present embodiment.

Figure 2:
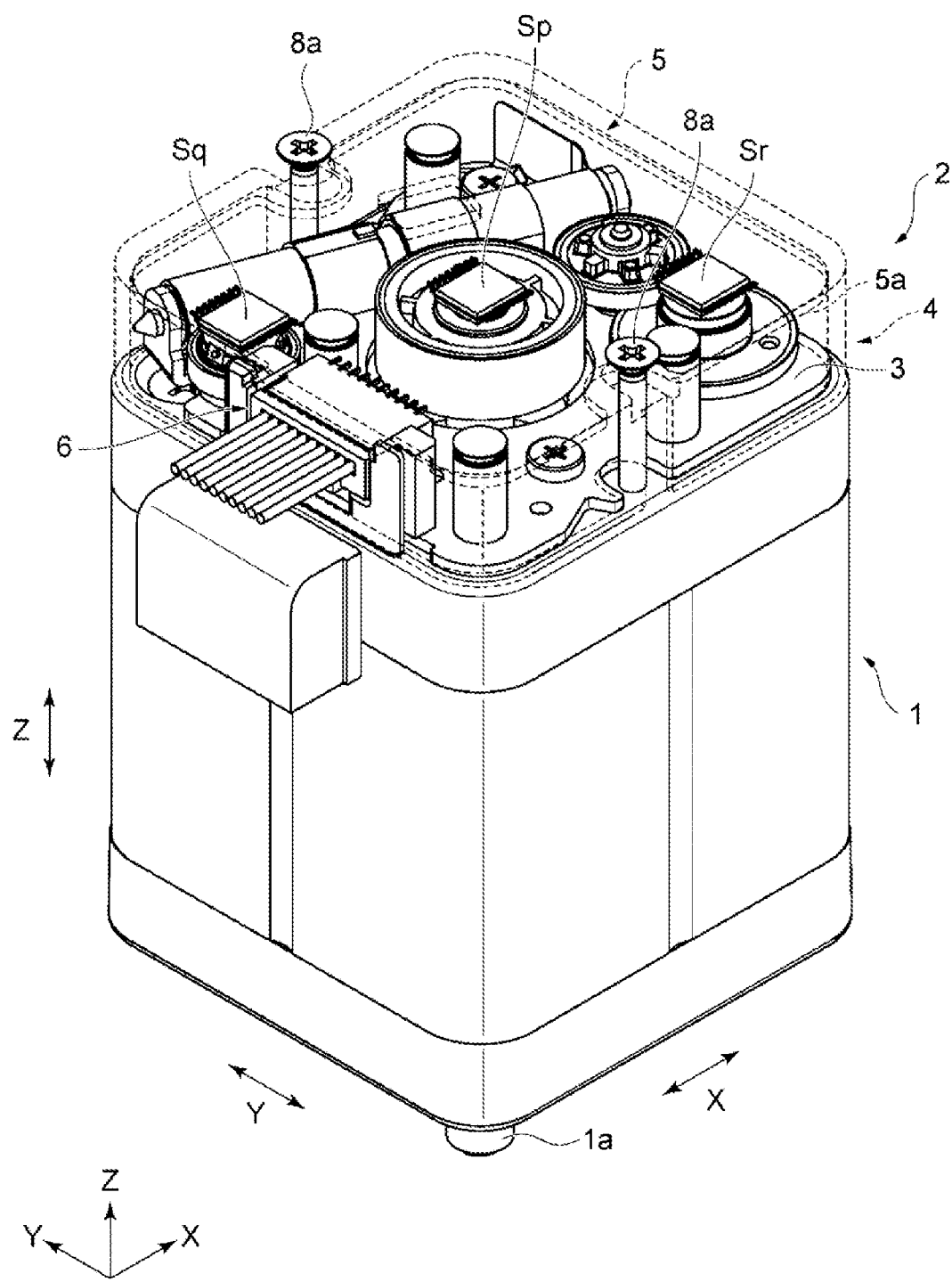
FIG. 2 is a perspective view schematically illustrating the configuration of the absolute encoder illustrated in FIG. 1 with a shield plate removed.
Figure 3:
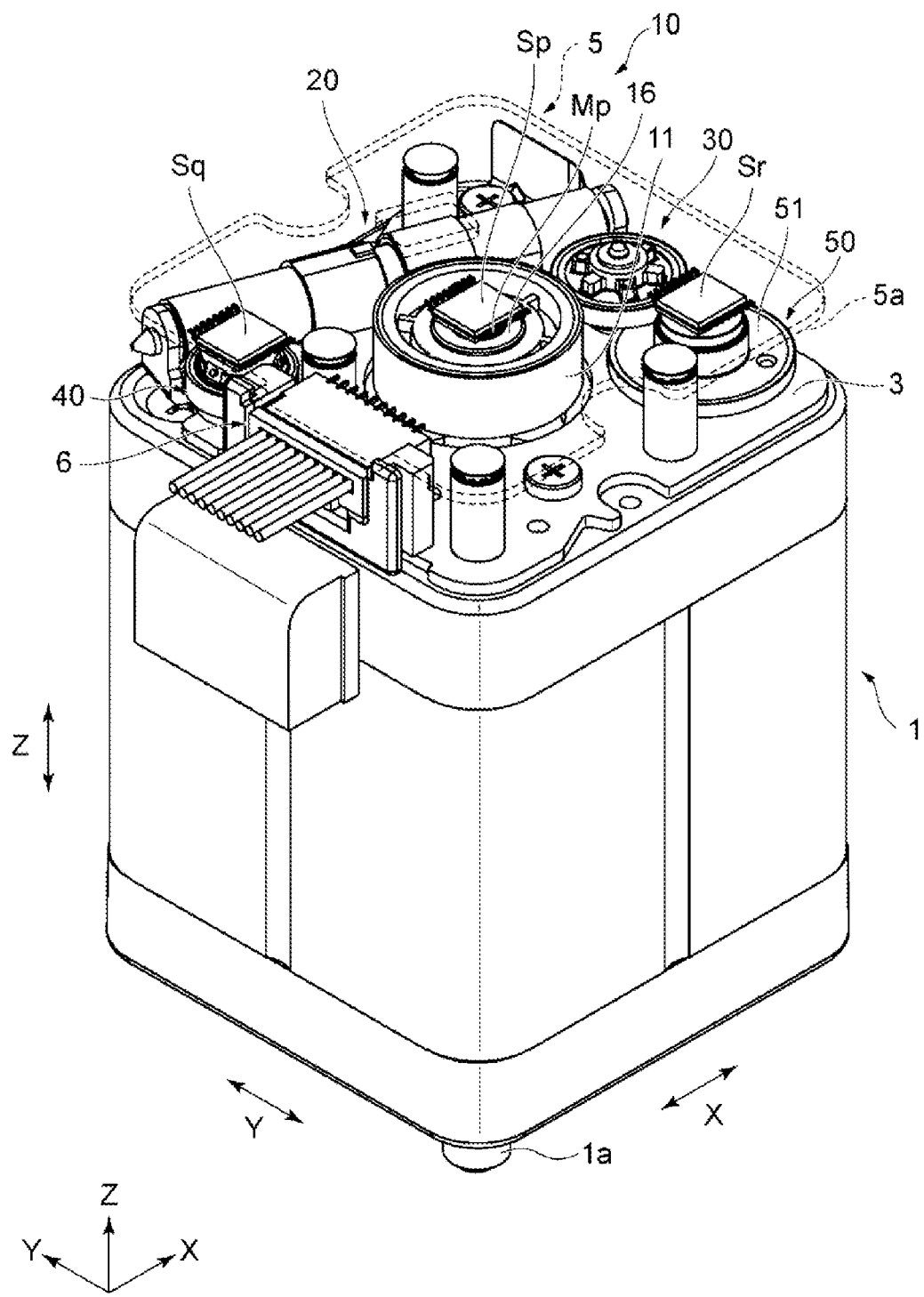
FIG. 3 is a perspective view schematically illustrating the configuration of the absolute encoder illustrated in FIG. 2 with a case removed.
Figure 4:
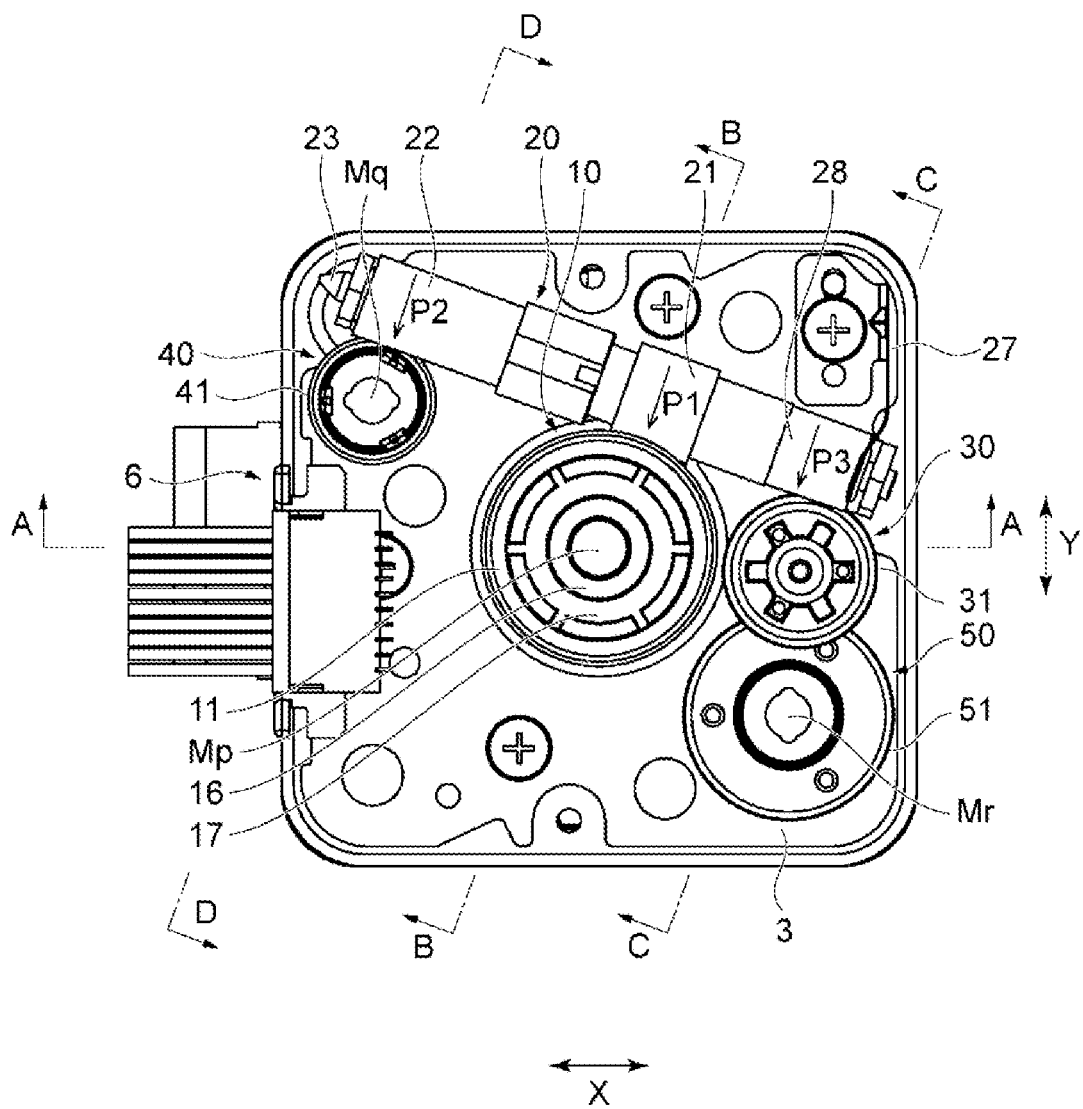
FIG. 4 is a plan view schematically illustrating the configuration of the absolute encoder illustrated in FIG. 3 with a substrate removed.
Figure 5:
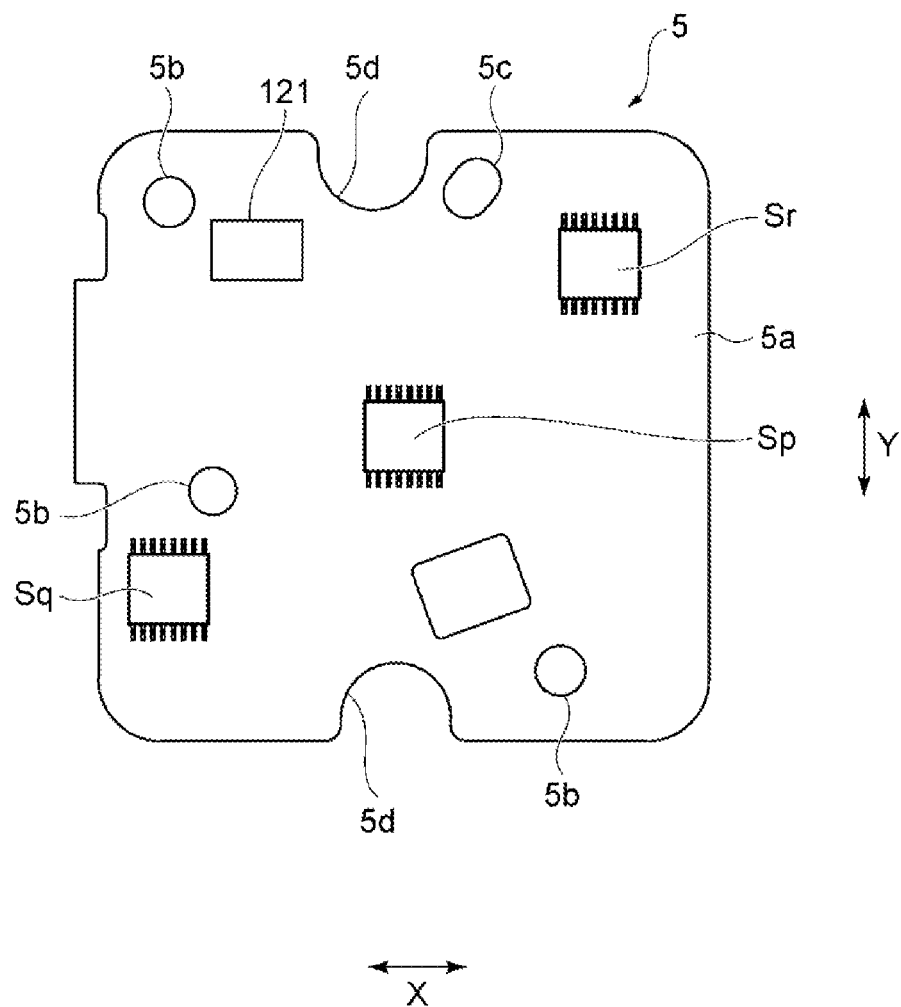
FIG. 5 is a view illustrating an angle sensor support substrate illustrated in FIG. 3 when viewed from a lower surface side.
Figure 6:
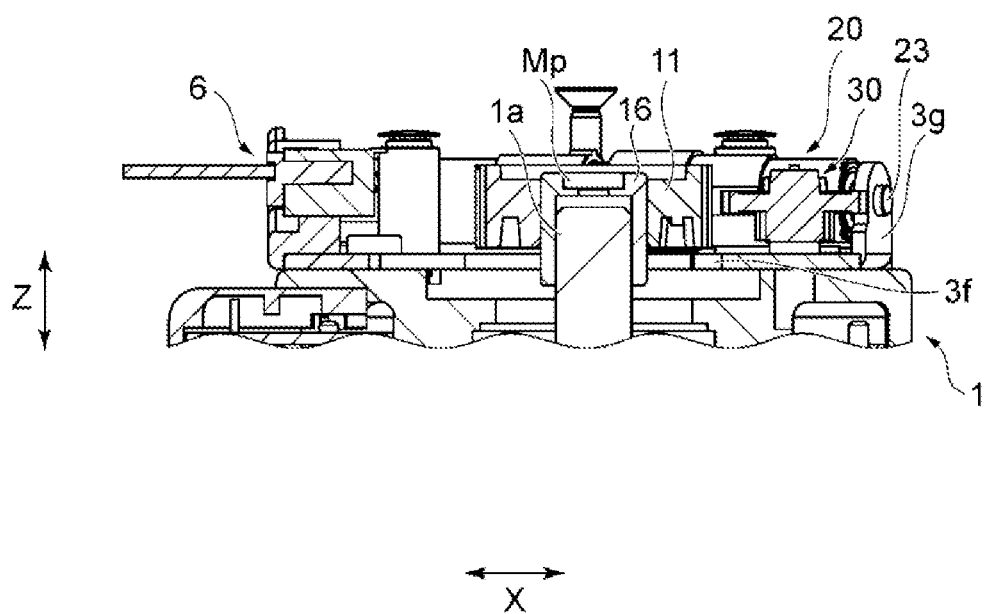
FIG. 6 is a cross-sectional view of the absolute encoder illustrated in FIG. 4 taken along line A-A.
Figure 7:
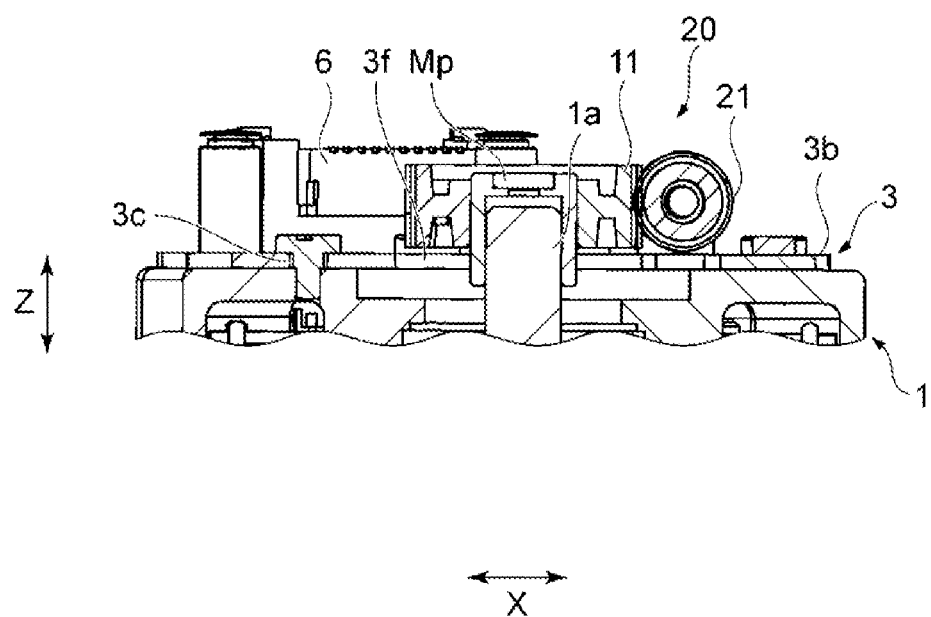
FIG. 7 is a cross-sectional view of the absolute encoder illustrated in FIG. 4 taken along line B-B.
Figure 8:
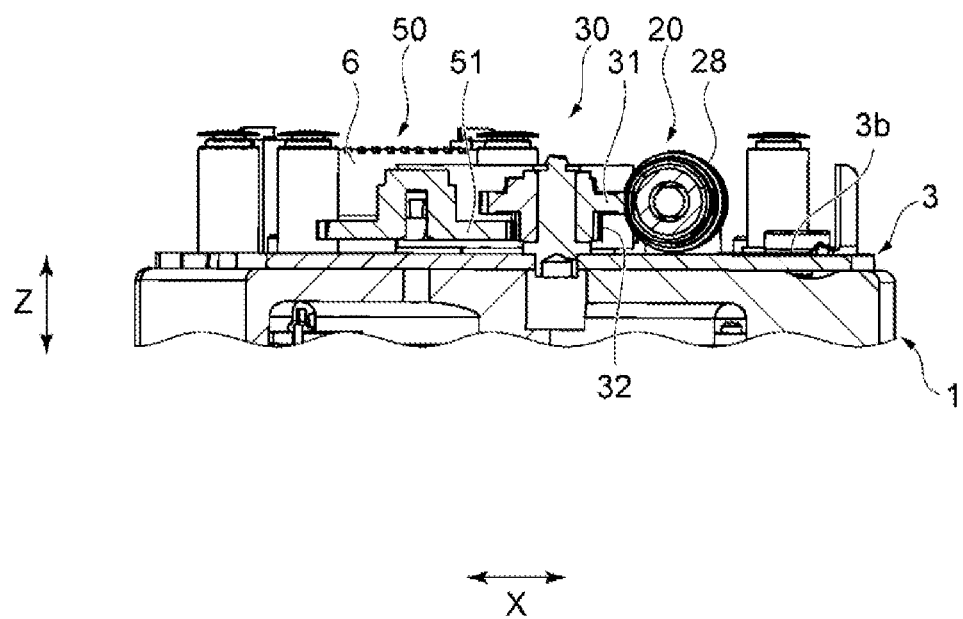
FIG. 8 is a cross-sectional view of the absolute encoder illustrated in FIG. 4 taken along line C-C.
Figure 9:
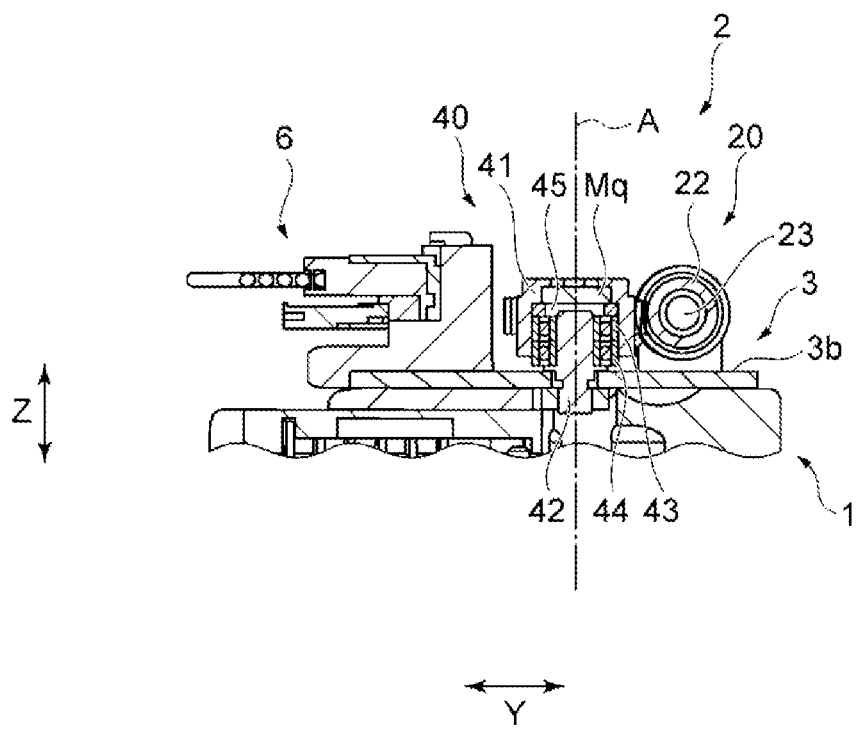
FIG. 9 is a cross-sectional view of the absolute encoder illustrated in FIG. 4 taken along line D-D.

FIG. 1 is a perspective view schematically illustrating the configuration of an absolute encoder 2 according to an embodiment of the present invention. FIG. 2 is a perspective view schematically illustrating the configuration of the absolute encoder 2 with a shield plate 7 removed. In FIG. 2, a case 4 and an angle sensor support substrate 5 of the absolute encoder 2 are transparently illustrated. FIG. 3 is a perspective view schematically illustrating the configuration of the absolute encoder 2 with the case 4 removed. In FIG. 3, the angle sensor support substrate 5 of the absolute encoder 2 is transparently illustrated. FIG. 4 is a plan view schematically illustrating the configuration of the absolute encoder 2 with the angle sensor support substrate 5 removed. FIG. 5 is a diagram of the angle sensor support substrate 5 when viewed from the lower side. FIG. 6 is a cross-sectional view of the absolute encoder 2 taken along line A-A. FIG. 7 is a cross-sectional view of the absolute encoder 2 taken along line B-B. FIG. 8 is a cross-sectional view of the absolute encoder 2 taken along line C-C. FIG. 9 is a cross-sectional view of the absolute encoder 2 taken along line D-D.

As illustrated in FIGS. 1 to 9, the absolute encoder 2 according to an embodiment of the present invention includes a first worm gear part 11, a first worm wheel part 21, a second worm gear part 22, a second worm wheel part 41, a support shaft 42, a magnet Mq, an angle sensor Sq, a first bearing 43, and a second bearing 44. The first worm gear part 11 is a first driving gear and rotates according to the rotation of a main shaft 1a. The first worm wheel part 21 is a first driven gear, has a central axis orthogonal to a central axis of the first worm gear part 11, and meshes with the first worm gear part 11. The second worm gear part 22 is a second driving gear, is provided coaxially with the first worm wheel part 21, and rotates according to the rotation of the first worm wheel part 21. The second worm wheel part 41 is a second driven gear, has a central axis orthogonal to the central axis of the first worm wheel part 21, and meshes with the second worm gear part 22. The support shaft 42 rotatably supports the second worm wheel part 41. The magnet Mq is provided as a permanent magnet at an axial line A of the support shaft 42 in the second worm wheel part 41. The angle sensor Sq is provided near the magnet Mq in a range capable of detecting a change in the magnetic flux of the magnet Mq, for example, on the axial line A or near the axial line A, and detects, as an angle sensor, the rotation angle of the second worm wheel part 41 corresponding to a change in the magnetic flux generated from the magnet Mq. The first bearing 43 has an outer ring 432 fixed at the second worm wheel part 41 by press-fitting and an inner ring 431 fixed at the support shaft 42 by press-fitting. The second bearing 44 has an inner ring 441 fixed at the support shaft 42 by press-fitting. Hereinafter, the structure of the absolute encoder 2 is specifically described.

In the present embodiment, for convenience of description, the absolute encoder 2 is described based on an XYZ orthogonal coordinate system. The X-axis direction corresponds to a horizontal left-right direction, the Y-axis direction corresponds to a horizontal front-rear direction, and the Z-axis direction corresponds to a vertical direction. The Y-axis direction and the Z-axis direction are orthogonal to the X-axis direction, respectively. In the present description, the X-axis direction is also referred to as a left side or a right side, the Y-axis direction is also referred to as a front side or a rear side, and the Z-axis direction is also referred to as an upper side or a lower side. In the orientation of the absolute encoder 2 illustrated in FIGS. 1 and 2, a left side in the X-axis direction is the left side and a right side in the X-axis direction is the right side. Furthermore, in the orientation of the absolute encoder 2 illustrated in FIGS. 1 and 2, a front side in the Y-axis direction is the front side and a back side in the Y-axis direction is the rear side. Furthermore, in the orientation of the absolute encoder 2 illustrated in FIGS. 1 and 2, an upper side in the Z-axis direction is on the upper side and a lower side in the Z-axis direction is the lower side. A state when viewed from the upper side in the Z-axis direction is referred to as a plan view, a state when viewed from the front side in the Y-axis direction is referred to as a front view, and a state when viewed from the left side in the X-axis direction is referred to as a side view. The notation for such directions does not limit the usage orientation of the absolute encoder 2, and the absolute encoder 2 may be used in any orientation.

As described above, the absolute encoder 2 is an encoder of an absolute type configured to specify and output the amount of rotation over a plurality of rotations of the main shaft 1a of a motor 1 as illustrated in FIGS. 1 and 2. In an embodiment of the present invention, the absolute encoder 2 is provided at an upper end part of the motor 1 in the Z-axis direction. In the embodiment of the present invention, the absolute encoder 2 has a substantially rectangular shape in the plan view and has a thin and horizontally long rectangular shape in the vertical direction, that is, the extension direction of the main shaft 1a in the front view and the side view. That is, the absolute encoder 2 has a flat rectangular parallelepiped shape longer in the horizontal direction than in the vertical direction.

The absolute encoder 2 includes the case 4 having a hollow square tubular shape and accommodating an internal structure. The case 4 includes a plurality of (for example, four) outer wall parts 4a surrounding at least a part of the main shaft 1a of the motor 1, a main shaft gear 10, a first intermediate gear 20, a second intermediate gear 30, a first sub-shaft gear 40, a second sub-shaft gear 50, and the like, and has an open upper end part. In the case 4, the shield plate 7 serving as a magnetic flux shielding member and being a rectangular plate-shaped member is fixed at the case 4 and a gear base part 3 with substrate mounting screws 8a at the open upper end parts of the four outer wall parts 4a.

The shield plate 7 is a plate-shaped member provided between the angle sensors Sp, Sq, and Sr and the outside of the absolute encoder 2 in the axial direction (Z-axis direction). The shield plate 7 is formed of a magnetic material in order to prevent magnetic interference due to a magnetic flux generated outside the absolute encoder 2 by the angle sensors Sp, Sq, and Sr provided at the inside of the case 4.

As an example, the motor 1 may be a stepping motor or a DC brushless motor. As an example, the motor 1 may be a motor applied as a driving source for driving a robot for an industrial use or the like via a reduction mechanism such as a wave gear device. Both sides of the shaft 1a of the motor 1 in the vertical direction project from the case of the motor. The absolute encoder 2 outputs the amount of rotation of the main shaft 1a of the motor 1 as a digital signal.

The motor 1 has a substantially rectangular shape in the plan view and has a substantially rectangular shape even in the vertical direction. That is, the motor 1 has a substantially cubic shape. In the plan view, each of the four outer wall parts constituting the outer shape of the motor 1 has a length of, for example, 25 mm, that is, the outer shape of the motor 1 is 25 mm square in the plan view. Furthermore, the absolute encoder 2 provided at the motor 1 is, for example, a 25 mm square according to the outer shape of the motor 1.

In FIGS. 1 and 2, the angle sensor support substrate 5 is provided to cover the inside of the absolute encoder 2 together with the case 4 and the shield plate 7.

As illustrated in FIG. 5, the angle sensor support substrate 5 has a substantially rectangular shape in the plan view and is a thin plate-shaped printed wiring substrate in the vertical direction. Furthermore, a connector 6 is connected to the angle sensor support substrate 5 and is for connecting the absolute encoder 2 and an external device (not illustrated).

As illustrated in FIGS. 2, 3, and 4, the absolute encoder 2 includes the main shaft gear 10 having the first worm gear part 11 (first driving gear), and the first intermediate gear 20 having the first worm wheel part 21 (first driven gear), the second worm gear part 22 (second driving gear), and a third worm gear part 28 (third driving gear). The absolute encoder 2 also includes the second intermediate gear 30 having a third worm wheel part 31 (third driven gear) and a first spur gear part 32 (fourth driving gear), the first sub-shaft gear 40 having the second worm wheel part 41 (second driven gear) and the support shaft 42 (see FIG. 9), and the second sub-shaft gear 50 having a second spur gear part 51 (third driven gear). The absolute encoder 2 also includes a magnet Mp, the angle sensor Sp corresponding to the magnet Mp, the magnet Mq, the angle sensor Sq corresponding to the magnet Mq, a magnet Mr, the angle sensor Sr corresponding to the magnet Mr, and a microcomputer 121.

As illustrated in FIGS. 4 and 6, the main shaft 1a of the motor 1 is an output shaft of the motor 1 and is an input shaft configured to transmit a rotational force to the absolute encoder 2. The main shaft gear 10 is fixed at the main shaft 1a of the motor 1 and is rotatably supported by a bearing member of the motor 1 integrally with the main shaft 1a. The first worm gear part 11 is provided at an outer periphery of the main shaft gear 10 and rotates according to the rotation of the main shaft 1a of the motor 1. In the main shaft gear 10, the first worm gear part 11 is provided so that the central axis of the first worm gear part 11 matches or substantially matches a central axis of the main shaft 1a. The main shaft gear 10 can be formed of various materials such as a resin material or a metal material. The main shaft gear 10 is formed of, for example, a polyacetal resin.

As illustrated in FIGS. 3 and 4, the first intermediate gear 20 is a gear part configured to transmit the rotation of the main shaft gear 10 to the first sub-shaft gear 40 and the second intermediate gear 30. The first intermediate gear 20 is axially supported by a shaft 23 around a rotation axial line extending substantially parallel to a base part 3b. The first intermediate gear 20 is a substantially cylindrical member extending in the direction of the rotation axial line. The first intermediate gear 20 includes the first worm wheel part 21, the second worm gear part 22, and the third worm gear part 28. A through hole is formed at the inside of the first intermediate gear, and the shaft 23 is inserted into the through hole. The first intermediate gear 20 is axially supported by inserting the shaft 23 into first intermediate gear shaft support parts 3g provided at the base part 3b of the gear base part 3. The first worm wheel part 21, the second worm gear part 22, and the third worm gear part 28 are disposed at positions separated from each other in this order. The first intermediate gear 20 can be formed of various materials such as a resin material or a metal material. The first intermediate gear 20 is formed of a polyacetal resin.

As illustrated in FIGS. 4 and 7, the first worm wheel part 21 is provided at the outer periphery of the first intermediate gear 20. The first worm wheel part 21 is provided to mesh with the first worm gear part 11 and rotate according to the rotation of the first worm gear part 11. An axial angle between the first worm wheel part 21 and the first worm gear part 11 is set to 90° or approximately 90°.

Although there is no special restriction on an outer diameter of the first worm wheel part 21, in the illustrated example, the outer diameter of the first worm wheel part 21 is set to be smaller than the outer diameter of the first worm gear part 11, and the outer diameter of the first worm wheel part 21 is small. With this, the absolute encoder 2 is reduced in size in the vertical direction.

The second worm gear part 22 is provided at the outer periphery of the first intermediate gear 20. The second worm gear part 22 rotates with the rotation of the first worm wheel part 21. The second worm gear part 22 meshes with the second worm wheel part 41 of the first sub-shaft gear 40 to rotate the first sub-shaft gear 40. In the first intermediate gear 20, the second worm gear part 22 is provided so that a central axis of the second worm gear part 22 matches or substantially matches the central axis of the first worm wheel part 21.

As illustrated in FIGS. 4 and 8, the third worm gear part 28 is provided at the outer periphery of the first intermediate gear 20. The third worm gear part 28 rotates with the rotation of the first worm wheel part 21. The third worm gear part 28 meshes with the third worm wheel part 31 of the second intermediate gear 30 to rotate the second intermediate gear 30. In the first intermediate gear 20, the third worm gear part 28 is provided so that a central axis of the third worm gear part 28 matches or substantially matches the central axis of the first worm wheel part 21.

As illustrated in FIGS. 4 and 9, the first sub-shaft gear 40 is decelerated according to the rotation of the main shaft 1a and rotates integrally with the magnet Mq. The first sub-shaft gear 40 includes the second worm wheel part 41, the support shaft 42, the first bearing 43, the second bearing 44, and a first spacer 45. In the first sub-shaft gear 40, the second worm wheel part 41 is axially supported by the support shaft 42.

Figure 10:
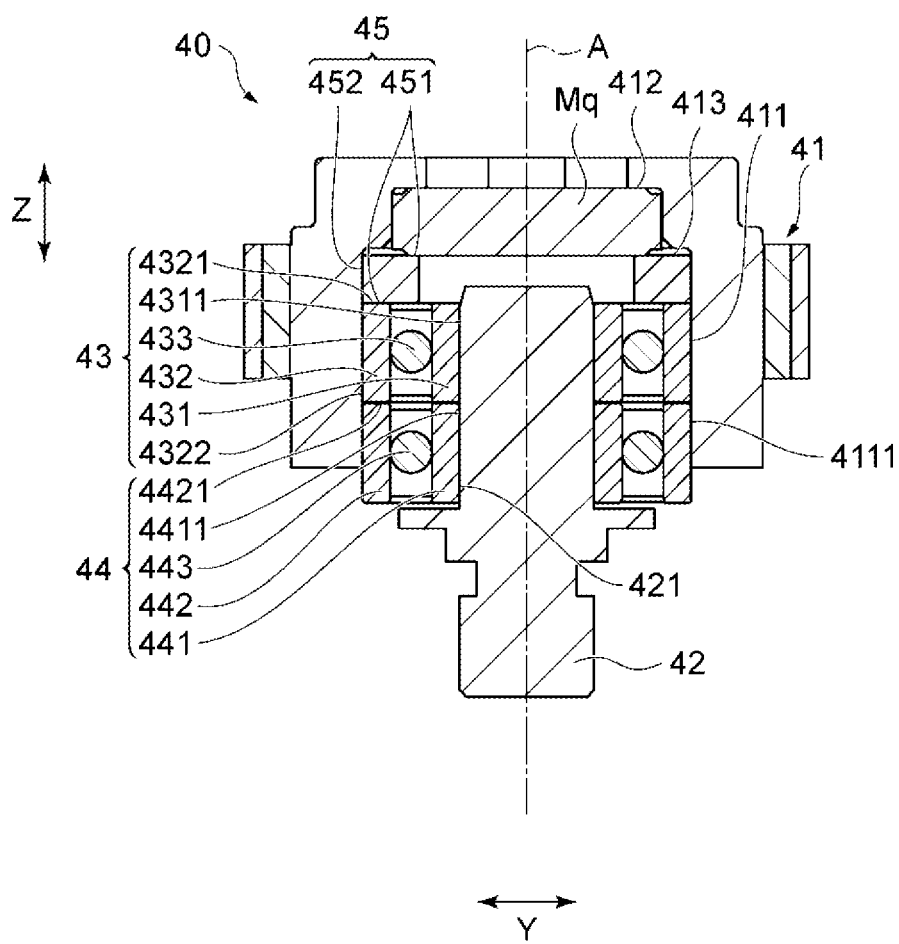
FIG. 10 is a cross-sectional view of a first sub-shaft gear in the absolute encoder illustrated in FIG. 9.

FIG. 10 is a cross-sectional view of the first sub-shaft gear 40 in the absolute encoder 2.

As illustrated in FIG. 10, the second worm wheel part 41 is a substantially circular member in the plan view. The second worm wheel part 41 can be formed of various materials such as a resin material or a metal material. The second worm wheel part 41 is formed of, for example, a polyacetal resin. The second worm wheel part 41 includes a bearing accommodating part 411, a magnet holding part 412, and a step part 413.

The second worm wheel part 41 is provided at an outer periphery of the first sub-shaft gear 40 and is provided to mesh with the second worm gear part 22 and rotate according to the rotation of the second worm gear part 22. An axial angle between the second worm wheel part 41 and the second worm gear part 22 is set to 90° or approximately 90°. A rotation axial line of the second worm wheel part 41 is provided parallel to or substantially parallel to a rotation axial line of the first worm gear part 11.

The bearing accommodating part 411 is a cylindrical hollow part provided at a position centered on the axial line A in the second worm wheel part 41. The bearing accommodating part 411 is open at one side in the direction along the axial line A, specifically at the lower side in the Z-axis direction in FIGS. 9 and 10. The dimension of an inner peripheral part 4111 of the bearing accommodating part 411 in the radial direction (direction perpendicular to the axial line A; the X-axis direction, the Y-axis direction) is set to allow the outer rings 432 and 442 of the first bearing 43 and the second bearing 44 to be press-fitted. The dimension of the bearing accommodating part 411 in the direction along the axial line A (the Z-axis direction) is set to allow the outer ring 432 of the first bearing 43 and the outer ring 442 of the second bearing 44 to be accommodated in the direction along the axial line A. The bearing accommodating part 411 is provided with the step part 413. The step part 413 is an annular surface being parallel to the X axis and the Y axis and centered on the axial line A at the other side in the direction along the axial line A, that is, at the upper side in the Z-axis direction in FIGS. 9 and 10. Note that the second worm wheel part 41 of the first sub-shaft gear 40 does not necessarily include the step part 413 when the diameter of the magnet Mq and the diameter of the first bearing 43 and the second bearing 44 are the same, for example.

Similar to the bearing accommodating part 411, the magnet holding part 412 is an annular hollow part provided at a position centered on the axial line A in the second worm wheel part 41. The magnet holding part 412 is formed to be capable of accommodating the magnet Mq. The magnet holding part 412 is provided closer to the other side in the direction along the axial line A than the step part 413, that is, at the upper side in the Z-axis direction in FIGS. 9 and 10. The magnet holding part 412 holds the magnet Mq in the hollow part described above.

The support shaft 42 rotatably supports the second worm wheel part 41 via the first bearing 43 and the second bearing 44. The support shaft 42 projects substantially vertically from the base part 3b of the gear base part 3.

The first bearing 43 includes the inner ring 431, the outer ring 432, and rolling elements 433. The inner ring 431 is an annular member having an inner peripheral part 4311 attachable at an outer peripheral part 421 of the support shaft 42. The outer ring 432 is provided at the outer peripheral side of the inner ring 431. The outer ring 432 is an annular member being coaxial with the inner ring 431 and having a larger diameter than that of the inner ring 431. The rolling elements 433 are a plurality of spherical members disposed between the inner ring 431 and the outer ring 432. The first bearing 43 has the inner ring 431 press-fitted into the outer peripheral part 421 of the support shaft 42. The first bearing 43 has a cylindrical part 4322 of the outer ring 432 press-fitted into the inner peripheral part 4111 of the bearing accommodating part 411 of the second worm wheel part 41. The first bearing 43 has a disk part 4321 at the upper side of the outer ring 432 in the direction along the axial line A (Z-axis direction) being in contact with the first spacer 45. In this manner, the first bearing 43 is accurately fixed at the second worm wheel part 41 and the support shaft 42 in the direction along the axial line A and the radial direction.

The second bearing 44 includes the inner ring 441, the outer ring 442, and rolling elements 443. The inner ring 441 is an annular member having an inner peripheral part 4411 attachable at the outer peripheral part 421 of the support shaft 42. The outer ring 442 is provided at the outer peripheral side of the inner ring 441. The outer ring 442 is an annular member being coaxial with the inner ring 441 and having a larger diameter than that of the inner ring 441. The rolling elements 443 are a plurality of spherical members disposed between the inner ring 441 and the outer ring 442. The second bearing 44 has the inner ring 441 press-fitted into the outer peripheral part 421 of the support shaft 42. The second bearing 44 has a disk part 4421 at the upper side of the outer ring 442 in the direction along the axial line A (Z-axis direction) being in contact with the disk part 4321 at the lower side of the outer ring 432 of the first bearing 43. The second bearing 44 also has a cylindrical part 4422 of the outer ring 442 press-fitted into the inner peripheral part 4111 of the bearing accommodating part 411 of the second worm wheel part 41.

The first spacer 45 is a disk-shaped member including a disk part 451 having an annular shape and a cylindrical part 452 having a cylindrical shape, both centered at the axial line A. The first spacer 45 is fitted to the inner peripheral part 4111 of the bearing accommodating part 411 in the radial direction. The first spacer 45 is in contact with the disk part 4321 of the outer ring 432 of the first bearing 43 at one side in the direction along the axial line A (lower side in the Z-axis direction). The first spacer 45 also is in contact with the magnet holding part 412 of the second worm wheel part 41 via the magnet Mq at the other side in the direction along the axial line A (upper side in the Z-axis direction).

With the above-described configuration, in the absolute encoder 2, the plurality of bearings (first bearing 43 and second bearing 44) included in the first sub-shaft gear 40 are press-fitted and fixed at the bearing accommodating part 411. Thus, the first sub-shaft gear 40 is accurately fixed at the support shaft 42 in the direction along the axial line A and the radial direction.

The magnet Mq is a permanent magnet provided at the axial line A of the support shaft 42 at a distal end side of the second worm wheel part 41 (upper side in the Z-axis direction). The magnet Mq is fitted to the inner peripheral part 4111 of the bearing accommodating part 411 in the radial direction. The magnet Mq is pressed against the first spacer 45, and thus is fixed at the upper side of the bearing accommodating part 411 in the direction along the axial line A. The angle sensor Sq is provided at the axial line A, similarly to the magnet Mq. The angle sensor Sq detects a change in the magnetic flux generated from the magnet Mq.

In FIGS. 4 and 8, the second intermediate gear 30 is a disk-shaped gear part configured to rotate according to the rotation of the main shaft 1a, decelerate the rotation of the main shaft 1a, and transmit the decelerated rotation to the second sub-shaft gear 50. The second intermediate gear 30 is provided between the second worm gear part 22 and the second spur gear part 51 provided at the second sub-shaft gear 50. The second spur gear part 51 meshes with the first spur gear part 32. The second intermediate gear 30 includes the third worm wheel part 31 configured to mesh with the third worm gear part 28 of the first intermediate gear 20, and the first spur gear part 32 configured to drive the second spur gear part 51. The second intermediate gear 30 is formed of, for example, a polyacetal resin. The second intermediate gear 30 is a substantially circular member in the plan view. The second intermediate gear 30 is axially supported by the base part 3b of the gear base part 3.

The providing of the second intermediate gear 30 enables the second sub-shaft gear 50 to be described below to be disposed at a position away from the third worm gear part 28. Therefore, the distance between the magnets Mp and Mq can be increased to reduce an influence of a leakage flux on the magnets Mp and Mq. Furthermore, the providing of the second intermediate gear 30 enables the expansion of the range allowing the reduction ratio to be set, improving the degree of freedom in design.

The third worm wheel part 31 is provided at an outer periphery of the second intermediate gear 30 and is provided to mesh with the third worm gear part 28 and rotate according to the rotation of the third worm gear part 28. The first spur gear part 32 is provided at the outer periphery of the second intermediate gear 30 so that a central axis of the first spur gear part 32 matches or substantially matches a central axis of the third worm wheel part 31. The first spur gear part 32 is provided to mesh with the second spur gear part 51 and rotate according to the rotation of the third worm wheel part 31. A rotation axial line of the third worm wheel part 31 and the first spur gear part 32 is provided parallel to or substantially parallel to the rotation axial line of the first worm gear part 11.

In FIG. 8, the second sub-shaft gear 50 is a gear part having a circular shape in the plan view, rotates according to the rotation of the main shaft 1a, decelerates the rotation of the main shaft 1a, and transmits the decelerated rotation to the magnet Mr. The second sub-shaft gear 50 is axially supported around a rotation axial line extending substantially vertically from the base part 3b of the gear base part 3. The second sub-shaft gear 50 includes the second spur gear part 51 and a magnet holding part configured to hold the magnet Mr.

The second spur gear part 51 is provided at an outer periphery of the second sub-shaft gear 50 so that a central axis of the second spur gear part 51 matches or substantially matches the central axis of the first spur gear part 32. The second spur gear part 51 is provided to mesh with the first spur gear part 32 and rotate according to the rotation of the third worm wheel part 31. A rotation axial line of the second spur gear part 51 is provided parallel to or substantially parallel to the rotation axial line of the first spur gear part 32. The second sub-shaft gear 50 can be formed of various materials such as a resin material or a metal material. The second sub-shaft gear 50 is formed of a polyacetal resin.

Hereinafter, a direction of the first worm wheel part 21 opposing the first worm gear part 11 to mesh with the first worm gear part 11 is referred to as a first meshing direction P1 (direction of arrow P1 in FIG. 4). Similarly, a direction of the second worm gear part 22 opposing the second worm wheel part 41 to mesh with the second worm wheel part 41, is referred to as a second meshing direction P2 (direction of arrow P2 in FIG. 4). Moreover, a direction of the third worm gear part 28 opposing the third worm wheel part 31 to mesh with the third worm wheel part 31 is referred to as a third meshing direction P3 (direction of arrow P3 in FIG. 4). In the present embodiment, the first meshing direction P1, the second meshing direction P2, and the third meshing direction P3 are all directions along a horizontal plane (XY plane).

The magnet Mp is fixed at an upper surface of the main shaft gear 10 so that the central axes of the magnet Mp and the main shaft gear 10 match or substantially match each other. The magnet Mp is supported by a magnet support part 17 provided at a central axis of the main shaft gear 10 via a holder part 16. The holder part 16 is formed of a non-magnetic material such as an aluminum alloy. An inner peripheral surface of the holder part 16 is formed, for example, in an annular shape corresponding to an outer diameter of the magnet Mp and the shape of an outer peripheral surface of the magnet Mp so as to be in contact with the outer peripheral surface of the magnet Mp in a radial direction and to hold the outer peripheral surface. Furthermore, an inner peripheral surface of the magnet support part 17 is formed, for example, in an annular shape corresponding to an outer diameter of the holder part 16 and the shape of an outer peripheral surface of the holder part 16 so as to be in contact with the outer peripheral surface of the holder part 16. The magnet Mp has 2-pole magnetic poles arranged in a direction perpendicular to a rotation axial line of the main shaft gear 10. In order to detect a rotation angle of the main shaft gear 10, the angle sensor Sp is provided at a lower surface 5a of the angle sensor support substrate 5 so that a lower surface of the angle sensor Sp opposes the upper surface of the magnet Mp in the vertical direction via a gap.

As an example, the angle sensor Sp is fixed at the angle sensor support substrate 5 supported by a substrate post 110 disposed at the gear base part 3 to be described below in the absolute encoder 2. The angle sensor Sp detects the magnetic pole of the magnet Mp, and outputs detection information to the microcomputer 121. The microcomputer 121 specifies the rotation angle of the main shaft gear 10, that is, a rotation angle of the main shaft 1a, by specifying a rotation angle of the magnet Mp on the basis of the received magnetic pole-related detection information. The resolution of the rotation angle of the main shaft 1a corresponds to the resolution of the angle sensor Sp. As will be described below, the microcomputer 121 specifies the amount of rotation of the main shaft 1a on the basis of a specified rotation angle of the first sub-shaft gear 40 and the specified rotation angle of the main shaft 1a, and outputs the specified amount of rotation. As an example, the microcomputer 121 may output the amount of rotation of the main shaft 1a of the motor 1 as a digital signal.

The angle sensor Sq detects the rotation angle of the second worm wheel part 41, that is, the rotation angle of the first sub-shaft gear 40. The magnet Mq is fixed at an upper surface of the first sub-shaft gear 40 so that the central axes of the magnet Mq and the first sub-shaft gear 40 match or substantially match each other. The magnet Mq has 2-pole magnetic poles arranged in a direction perpendicular to a rotation axial line of the first sub-shaft gear 40. As illustrated in FIG. 3, in order to detect the rotation angle of the first sub-shaft gear 40, the angle sensor Sq is provided so that a lower surface of the angle sensor Sq opposes an upper surface of the magnet Mq in the vertical direction via a gap.

As an example, the angle sensor Sq is fixed at the angle sensor support substrate 5 at the same surface as the surface where the angle sensor Sp is fixed, the angle sensor Sp being fixed at the angle sensor support substrate 5. The angle sensor Sq detects the magnetic pole of the magnet Mq, and outputs detection information to the microcomputer 121. The microcomputer 121 specifies a rotation angle of the magnet Mq, that is, the rotation angle of the first sub-shaft gear 40, on the basis of the received magnetic pole-related detection information.

The angle sensor Sr detects a rotation angle of the second spur gear part 51, that is, a rotation angle of the second sub-shaft gear 50. The magnet Mr is fixed at an upper surface of the second sub-axis gear 50 so that the central axes of the magnet Mr and the second sub-shaft gear 50 match or substantially match each other. The magnet Mr has 2-pole magnetic poles arranged in a direction perpendicular to a rotation axial line of the second sub-shaft gear 50. As illustrated in FIG. 3, in order to detect the rotation angle of the second sub-shaft gear 50, the angle sensor Sr is provided so that a lower surface of the angle sensor Sr opposes an upper surface of the magnet Mr in the vertical direction via a gap.

As an example, the angle sensor Sr is fixed at the angle sensor support substrate 5 supported by the substrate post 110 disposed at the gear base part 3 to be described below in the absolute encoder 2. The angle sensor Sr detects the magnetic pole of the magnet Mr, and outputs detection information to the microcomputer 121. The microcomputer 121 specifies a rotation angle of the magnet Mr, that is, the rotation angle of the second sub-shaft gear 50, on the basis of the received magnetic pole-related detection information.

A magnetic angle sensor having a relatively high resolution may be used for each magnetic sensor. The magnetic angle sensor is disposed to oppose an end face including magnetic poles of each permanent magnet in the axial direction of each rotating body via a certain gap, specifies a rotation angle of an opposing rotating body on the basis of the rotation of these magnetic poles, and outputs a digital signal. Examples of the magnetic angle sensor include a detection element configured to detect a magnetic pole and an arithmetic circuit configured to output a digital signal on the basis of the output of the detection element. The detection element may include, for example, a plurality of (for example, four) magnetic field detection elements such as a Hall element or a giant magneto-resistive (GMR) element.

The arithmetic circuit may specify, for example, a rotation angle by table processing using a look-up table using, as a key, the difference or ratio of the outputs of the plurality of detection elements. The detection element and the arithmetic circuit may be integrated on one IC chip. This IC chip may be embedded in a resin having a thin rectangular parallelepiped outer shape. Each magnetic sensor outputs an angle signal to the microcomputer 121 as a digital signal corresponding to the rotation angle of each rotating body detected via a wiring member (not illustrated). For example, each magnetic sensor outputs the rotation angle of each rotating body as a digital signal of multiple bits (for example, 7 bits).

Figure 11:
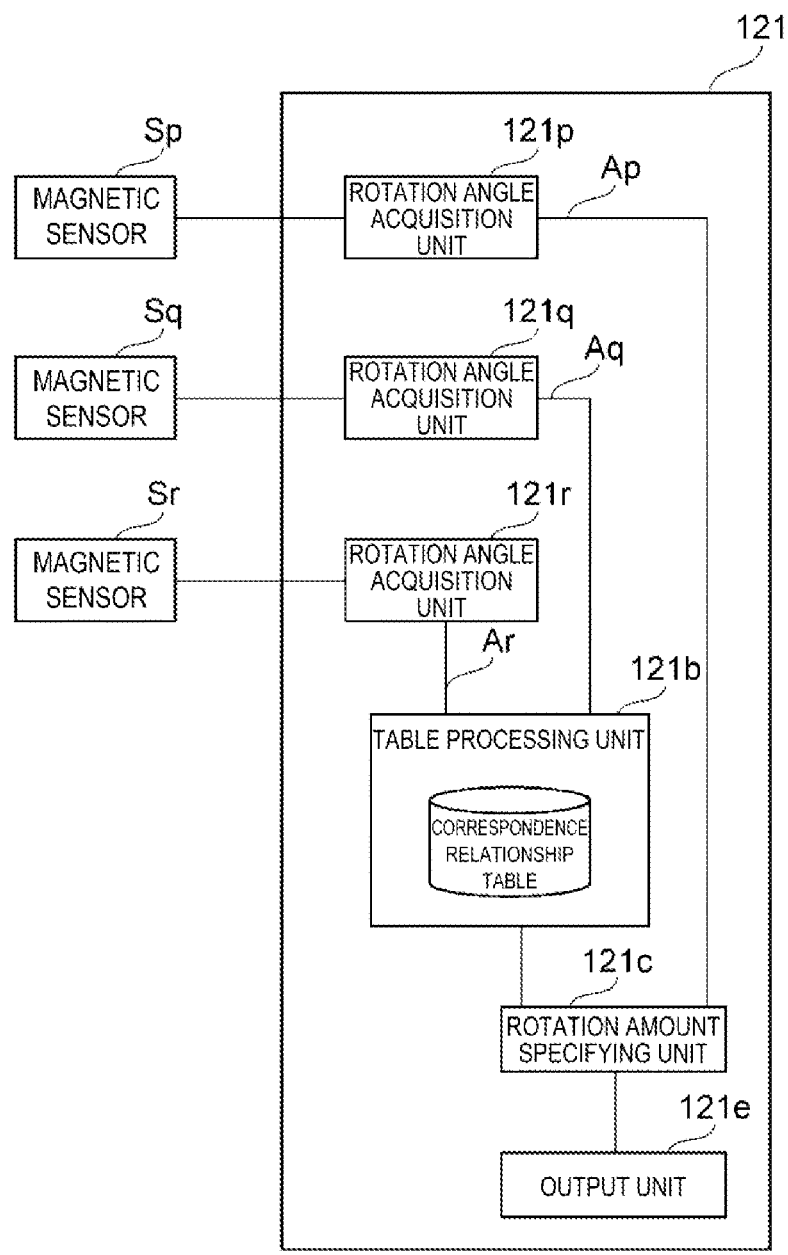
FIG. 11 is a block diagram schematically illustrating a functional configuration of the absolute encoder illustrated in FIG. 1.

FIG. 11 is a block diagram schematically illustrating a functional configuration of the absolute encoder. As illustrated in FIG. 11, the microcomputer 121 is fixed at a surface of the angle sensor support substrate 5 at the base part 3b side of the gear base part 3, by a method such as soldering or bonding. The microcomputer 121 includes a CPU, acquires the digital signal output from each of the angle sensors Sp, Sq, and Sr and representing the rotation angle, and calculates the amount of rotation of the main shaft gear 10. Each block of the microcomputer 121 illustrated in FIG. 11 represents a function implemented by the CPU as the microcomputer 121 executing a program. Each block of the microcomputer 121 can be implemented by an element or a mechanical device such as a central processing unit (CPU) or a random access memory (RAM) of a computer, in terms of hardware, and is implemented by a computer program or the like in terms of software, but in the present specification, function blocks implemented by cooperation of hardware and software are drawn. Accordingly, it is understood by those skilled in the art who have read the present specification that these functional blocks can be implemented in various forms by combining hardware and software.

The microcomputer 121 includes a rotation angle acquisition unit 121p, a rotation angle acquisition unit 121q, a rotation angle acquisition unit 121r, the table processing unit 121b, the rotation amount specifying unit 121c, and the output unit 121e. The rotation angle acquisition unit 121p acquires a rotation angle Ap as angle information indicating the rotation angle of the main shaft gear 10, that is, the main shaft 1a, on the basis of a signal output from the angle sensor Sp. The rotation angle acquisition unit 121q acquires a rotation angle Aq as angle information indicating the rotation angle of the first sub-shaft gear 40 on the basis of a signal output from the angle sensor Sq. The rotation angle acquisition unit 121r acquires a rotation angle Ar as angle information indicating the rotation angle of the second sub-shaft gear 50 detected by the angle sensor Sr.

The table processing unit 121b refers to a first correspondence relationship table with the rotation angle Ap and the number of rotations of the main shaft gear 10 corresponding to the rotation angle Ap stored and specifies the number of rotations of the main shaft gear 10 corresponding to the acquired rotation angle Ap. Furthermore, the table processing unit 121b refers to a second correspondence relationship table with the rotation angle Ar and the number of rotations of the main shaft gear 10 corresponding to the rotation angle Ar stored, and specifies the number of rotations of the main shaft gear 10 corresponding to the acquired rotation angle Ar.

The rotation amount specifying unit 121c specifies a first amount of rotation over a plurality of rotations of the main shaft gear 10 according to the number of rotations of the main shaft gear 10 specified by the table processing unit 121b and the acquired rotation angle Aq. The output unit 121e converts the amount of rotation of the main shaft gear 10 specified by the rotation amount specifying unit 121c over the plurality of rotations into information indicating the amount of rotation, and outputs the information.

The table processing unit 121b, the rotation amount specifying unit 121c, and the output unit 121e also function as an angle position information output unit configured to output angle position information of the first worm gear part 11 to be described below to an external control device (controller). Furthermore, the table processing unit 121b, the rotation amount specifying unit 121c, and the output unit 121e also output angle error information for correcting the angle position information of the first worm gear part 11 to be described below to the external control device.

The absolute encoder 2 configured in this way can specify the number of rotations of the main shaft 1a according to the rotation angles of the first sub-shaft gear 40 and the second sub-shaft gear 50 specified on the basis of the detection information of the angle sensors Sq and Sr, and specify the rotation angle of the main shaft 1a on the basis of the detection information of the angle sensor Sp. Then, the microcomputer 121 specifies the amount of rotation of the main shaft 1a over a plurality of rotations on the basis of the specified number of rotations of the main shaft 1a and the specified rotation angle of the main shaft 1a.

The number of rows of the first worm gear part 11 of the main shaft gear 10 provided at the main shaft 1a is, for example, 1, and the number of teeth of the first worm wheel part 21 is, for example, 20. That is, the first worm gear part 11 and the first worm wheel part 21 constitute a first transmission mechanism having a reduction ratio of 20 (=20/1) (see FIG. 4). When the first worm gear part 11 rotates 20 times, the first worm wheel part 21 rotates once. Since the first worm wheel part 21 and the second worm gear part 22 are provided coaxially to form the first intermediate gear 20 and rotate integrally, when the first worm gear part 11 rotates 20 times, that is, when the main shaft 1a and the main shaft gear 10 rotate 20 times, the first intermediate gear 20 rotates once and the second worm gear part 22 rotates once.

The number of rows of the second worm gear part 22 is, for example, 5, and the number of teeth of the second worm wheel part 41 is, for example, 25. That is, the second worm gear part 22 and the second worm wheel part 41 constitute a second transmission mechanism having a reduction ratio of 5 (=25/5) (see FIG. 4). When the second worm gear part 22 rotates five times, the second worm wheel part 41 rotates once. Since the first sub-shaft gear 40 formed by the second worm wheel part 41 rotates integrally with a magnet holder 35 and the magnet Mq as will be described below, when the second worm gear part 22 constituting the first intermediate gear 20 rotates five times, the magnet Mq rotates once. From the above, when the main shaft 1a rotates 100 times, the first intermediate gear 20 rotates five times and the first sub-shaft gear 40 and the magnet Mq rotate once. That is, the number of rotations for 50 rotations of the main shaft 1a can be specified by detection information of the angle sensor Sq regarding the rotation angle of the first sub-shaft gear 40.

The number of rows of the third worm gear part 28 is, for example, 1, and the number of teeth of the third worm wheel part 31 is, for example, 30. That is, the third worm gear part 28 and the third worm wheel part 31 constitute a third transmission mechanism having a reduction ratio of 30 (=30/1) (see FIG. 4). When the third worm gear part 28 rotates 30 times, the third worm wheel part 31 rotates once. The second intermediate gear 30 formed by the third worm wheel part 31 is provided with the first spur gear part 32 having the central axis matching or substantially matching the central axis of the third worm wheel part 31. Therefore, when the third worm wheel part 31 rotates, the first spur gear part 32 also rotates. Since the first spur gear part 32 meshes with the second spur gear part 51 provided at the second sub-shaft gear 50, when the second intermediate gear 30 rotates, the second sub-shaft gear 50 also rotates.

The number of teeth of the second spur gear part 51 is, for example, 40, and the number of teeth of the first spur gear part 32 is, for example, 24. That is, the first spur gear part 32 and the second spur gear part 51 constitute a fourth transmission mechanism having a reduction ratio of 5/3 (=40/24) (see FIG. 4). When the first spur gear part 32 rotates five times, the second spur gear part 51 rotates three times. Since the second sub-shaft gear 50 formed by the second spur gear part 51 rotates integrally with the magnet Mr as will be described below, when the third worm gear part 28 constituting the first intermediate gear 20 rotates five times, the magnet Mr rotates once. From the above, when the main shaft 1a rotates 1,000 times, the first intermediate gear 20 rotates 50 times, the second intermediate gear 30 rotates 5/3 times, and the second sub-shaft gear 50 and the magnet Mr rotate once. That is, the number of rotations for 1,000 rotations of the main shaft 1a can be specified by detection information of the angle sensor Sr regarding the rotation angle of the second sub-shaft gear 50.

Operation of Absolute Encoder

Hereinafter, the operation of the absolute encoder 2 is described.

As described above (see FIGS. 1 to 11), the first sub-shaft gear 40 of the absolute encoder 2 includes the second worm wheel part 41 as a second driven gear, the support shaft 42, the first bearing 43, the second bearing 44, and the first spacer 45. The outer rings 432 and 442 of the first bearing 43 and the second bearing 44 are press-fitted into the bearing accommodating part 411 as a cylindrical hollow part formed at a position centered on the axial line A of the second worm wheel part 41. The inner rings 431 and 441 of the first bearing 43 and the second bearing 44 are press-fitted into the support shaft 42.

With the above-described configuration, in the absolute encoder 2, the plurality of bearings fixed at the support shaft 42 of the first sub-shaft gear 40, that is, the outer ring 432 of the first bearing 43 and the outer ring 442 of the second bearing 44 are fixed at the inner peripheral part 4111 of the bearing accommodating part 411. Thus, with the absolute encoder 2, the tilting of the outer ring 432 of the first bearing 43 and the outer ring 442 of the second bearing 44 with respect to the support shaft 42 can be suppressed. That is, with the absolute encoder 2, movement of the first bearing 43 and the second bearing 44 at the inside the bearing accommodating part 411 is suppressed, and thus the vibration of the outer rings 432 and 442 of the first bearing 43 and the second bearing 44 caused in response to the rotation of the second worm wheel part 41 can be suppressed. Thus, with the absolute encoder 2, errors in detection of the rotation angle can be suppressed.

In the absolute encoder 2, the first spacer 45 is accommodated in the bearing accommodating part 411. The disk part 451 of the first spacer 45 at the upper side in the direction along the axial line A is in contact with the magnet Mq held by the magnet holding part 412. The first spacer 45 is in contact with the disk part 4321 of the outer ring 432 of the first bearing 43 in the direction along the axial line A. With the first spacer 45 included, in the absolute encoder 2, the outer ring 432 of the first bearing 43 is in contact (is pressed against) with the first spacer 45 at the upper side in the direction along the axial line A, and thus the tilting of the outer ring 432 with respect to the support shaft 42 (axial line A) can be suppressed. Also in the absolute encoder 2, the disk part 4421 of the outer ring 442 of the second bearing 44 is in contact, in the direction along the axial line A, with the disk part 4321 of the outer ring 432 of the first bearing 43 being in contact with the first spacer 45, and thus the tilting of the outer ring 442 with respect to the support shaft 42 (axial line A) can be suppressed.

That is, in the absolute encoder 2, the plurality of bearings (first bearing 43 and second bearing 44) are fitted and fixed by press-fitting to the bearing accommodating part 411. Thus, the first sub-shaft gear 40 is accurately supported with respect to the support shaft 42 in the direction along the axial line A and the radial direction.

Therefore, with the absolute encoder 2, movement of the first bearing 43 and the second bearing 44 inside the bearing accommodating part 411 is suppressed, and thus the vibration of the outer rings 432 and 442 of the first bearing 43 and the second bearing 44 caused in response to the rotation of the second worm wheel part 41 can be suppressed. Thus, with the absolute encoder 2, errors in detection of the rotation angle can be suppressed.

The absolute encoder 2 described above allows detection accuracy of the rotation angle of the sub-shaft to be improved.

Modification of First Sub-Shaft Gear

Next, a modification of the first sub-shaft gear 40 in the absolute encoder 2 described above is described.

Figure 12:
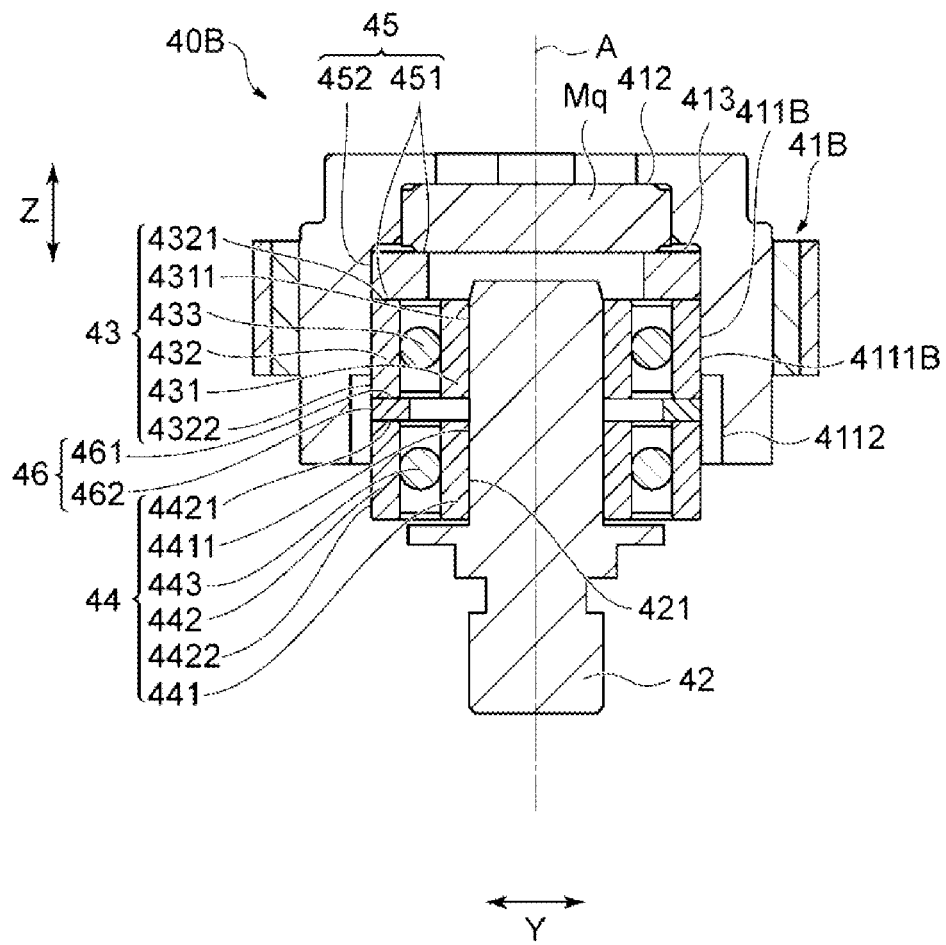
FIG. 12 is a cross-sectional view of a first sub-shaft gear according to a modification in the absolute encoder illustrated in FIG. 9.

FIG. 12 is an enlarged cross-sectional view of a first sub-shaft gear 40B according to the modification in the absolute encoder 2.

As illustrated in FIG. 12, in the first sub-shaft gear 40B according to the modification, the shape of a bearing accommodating part 411B as a cylindrical hollow part provided at a position centered on the axial line A of the second worm wheel part 41 differs from the shape of the bearing accommodating part 411 described above. The first sub-shaft gear 40B also differs from the first sub-shaft gear 40 described above in that a second spacer 46 is provided between the first bearing 43 and the second bearing 44. Hereinafter, the structure of the first sub-shaft gear 40B according to the modification in the absolute encoder 2 is specifically described.

The bearing accommodating part 411B is provided with a diameter expanded part 4112 near an open end at the lower side in the Z-axis direction. The diameter expanded part 4112 has dimensions in the radial direction (X-axis direction, Y-axis direction) expanded more than the inner peripheral part 4111B, that is, the outer rings 432 and 442 of the first bearing 43 and the second bearing 44. With the diameter expanded part 4112 provided, the cylindrical part 4422 of the outer ring 442 of the second bearing 44 is not press-fitted into the bearing accommodating part 411B of the second worm wheel part 41B.

The second spacer 46 is provided between the first bearing 43 and the second bearing 44 in the direction along the axial line A as described above. The second spacer 46 is in contact with the disk part 4321 at the lower side of the outer ring 432 of the first bearing 43 and the disk part 4421 at the upper side of the outer ring 442 of the second bearing 44 in the direction along the axial line A. The second spacer 46 is preferably an annular member formed of an elastic body, such as a rubber sheet or an O-ring.

With the above-described configuration, in the absolute encoder 2 including the first sub-shaft gear 40B, the outer ring 432 of the first bearing 43 is fixed at the inner peripheral part 4111B of the bearing accommodating part 411B. Thus, with the absolute encoder 2, the tilting of the outer ring 432 of the first bearing 43 can be suppressed, as is the case with the absolute encoder 2 including the first sub-shaft gear 40 described above.

In the absolute encoder 2 including the first sub-shaft gear 40B, the second spacer 46 is accommodated between the first bearing 43 and the second bearing 44 in the bearing accommodating part 411B. The second spacer 46 is in contact with the disk part 4321 at the lower side of the outer ring 432 of the first bearing 43 and the disk part 4421 at the upper side of the outer ring 442 of the second bearing 44 in the direction along the axial line A, and exerts an elastic force on the disk parts 4321 and 4421. With the second spacer 46 included, in the absolute encoder 2, the outer ring 442 of the second bearing 44 can receive a pre-load from the upper side in the direction along the axial line A, and thus the tilting of the outer ring 442 can be suppressed.

That is, with the absolute encoder 2 including the first sub-shaft gear 40B, movement of the first bearing 43 and the second bearing 44 at the inside of the bearing accommodating part 411 is suppressed, and thus the vibration of the outer rings 432 and 442 of the first bearing 43 and the second bearing 44 caused in response to the rotation of the second worm wheel part 41 can be suppressed. Thus, with the absolute encoder 2, errors in detection of the rotation angle can be suppressed.

The absolute encoder 2 including the first sub-shaft gear 40B according to the modification described above allows detection accuracy of the rotation angle of the sub-shaft to be improved, as is the case with the absolute encoder 2 including the first sub-shaft gear 40 described above.

The embodiment of the present invention has been described above; however, the present invention is not limited to the absolute encoder 2 according to the embodiment of the present invention described above, and includes all aspects included in the concepts and claims of the present invention. Furthermore, the respective configurations may be selectively combined as appropriate or may be combined with a known technology so as to achieve at least a part of the above-described problems and the effects. For example, a shape, a material, an arrangement, a size, and the like of each of the components in the embodiment described above may be changed as appropriate according to a specific usage aspect of the present invention.

For example, in the absolute encoder 2, the configuration of the first sub-shaft gear 40, 40B described above may be combined with the second sub-shaft gear 50 to suppress vibration of the second sub-shaft gear 50 and improve the detection accuracy of the rotation angle of the sub-shaft.

For example, in the absolute encoder 2, the number of bearings included in the first sub-shaft gear 40, 40B described above is not limited to two (the first bearing 43 and the second bearing 44), and may be three or more. In this case, in the bearings press-fitted with the outer ring, it suffices if the outer ring of at least one bearing is press-fitted into the first sub-shaft gear 40, 40B.

For example, in the absolute encoder 2, the first spacer 45 included in the first sub-shaft gear 40, 40B may have any shape as long as the first spacer 45 is in contact with the outer ring 432 of the first bearing 43. In other words, the first spacer 45 may have any shape as long as the inner ring 431 and the support shaft 42 are not in contact with the magnet Mq or the first spacer 45. Thus, the shape of the first spacer 45 is not limited to the annular shape described above, and may, for example, be formed in a disk shape partially having a recessed part.

REFERENCE SIGNS LIST

1 Motor
1a Main shaft
1b Press-fitting part
2 Absolute encoder
3 Gear base part
4 Case
4a Outer wall part
5 Angle sensor support substrate
5a Lower surface
6 Connector
7 Shield plate
8a Substrate mounting screw
10 Main shaft gear
11 First worm gear part
16 Holder part
17 Magnet support part
20 First intermediate gear
21 First worm wheel part
22 Second worm gear part
23 Shaft
28 Third worm gear part
30 Second intermediate gear
31 Third worm wheel part
32 First spur gear part
35 Magnet holder
40, 40B First sub-shaft gear 41, 41B Second worm wheel part
42 Support shaft
43 First bearing
44 Second bearing
45 First spacer
46 Second spacer
50 Second sub-shaft gear
51 Second spur gear part
121 Microcomputer
121b Table processing unit
121c Rotation amount specifying unit
121e Output unit
121p Rotation angle acquisition unit
121q Rotation angle acquisition unit
121r Rotation angle acquisition unit
411, 411B Bearing accommodating part
412 Magnet holding part
413 Step part
421 Outer peripheral part
431 Inner ring
432 Outer ring
433 Rolling element
441 Inner ring
442 Outer ring
443 Rolling element
451 Disk part
452 Cylindrical part
4111, 4311, 4411, 4111B Inner peripheral part
4112 Diameter expanded part
4321, 4421 Disk part
4322, 4422 Cylindrical part
Mp, Mq, Mr Magnet
Sp, Sq, Sr Angle sensor

The invention claimed is:

1. An absolute encoder comprising:
a first driving gear rotating according to rotation of a main shaft;
a first driven gear including a central axis orthogonal to a central axis of the first driving gear and meshing with the first driving gear;
a second driving gear provided coaxially with the first driven gear and rotating according to rotation of the first driven gear;
a second driven gear including a central axis orthogonal to the central axis of the first driven gear and meshing with the second driving gear;
a support shaft rotatably supporting the second driven gear;
a magnet rotating integrally with the support shaft;
an angle sensor provided near the magnet and detecting a change in a magnetic flux generated from the magnet;
a first bearing including an outer ring fixed at the second driven gear and an inner ring fixed at the support shaft; and
a second bearing including an inner ring fixed at the support shaft.

2. The absolute encoder according to claim 1, wherein
the second driven gear includes a bearing accommodating part as a hollow part having a cylindrical shape at a position centered on an axial line, and
the first bearing includes the outer ring fixed at the bearing accommodating part.

3. The absolute encoder according to claim 2, comprising a first spacer accommodated in the bearing accommodating part and being in contact with the outer ring of the first bearing in an axial direction.

4. The absolute encoder according to claim 3, wherein
the bearing accommodating part is open at one side in the axial direction, and
the first spacer is in contact with an inner peripheral part of the bearing accommodating part in a radial direction and in contact with the outer ring of the first bearing in the axial direction.

5. The absolute encoder according to claim 2, wherein the second bearing includes an outer ring being in contact with the outer ring of the first bearing in an axial direction.

6. The absolute encoder according to claim 2, wherein the second bearing includes an outer ring fixed at the bearing accommodating part.

7. The absolute encoder according to claim 1, comprising a second spacer provided between the first bearing and the second bearing and being in contact with the outer ring of the first bearing and the outer ring of the second bearing in an axial direction.

* * * * *